(12) United States Patent
Hariz

(10) Patent No.: US 9,094,105 B2
(45) Date of Patent: Jul. 28, 2015

(54) METHOD FOR USING POWER LINES FOR WIRELESS COMMUNICATION

(76) Inventor: Wally Hariz, Spanga (SE)

( * ) Notice: Subject to any disclaimer, the term of this patent is extended or adjusted under 35 U.S.C. 154(b) by 0 days.

(21) Appl. No.: 14/123,210

(22) PCT Filed: Apr. 4, 2012

(86) PCT No.: PCT/US2012/032081
§ 371 (c)(1),
(2), (4) Date: Nov. 30, 2013

(87) PCT Pub. No.: WO2012/166242
PCT Pub. Date: Dec. 6, 2012

(65) Prior Publication Data
US 2014/0092943 A1   Apr. 3, 2014

Related U.S. Application Data

(60) Provisional application No. 61/492,385, filed on Jun. 2, 2011.

(51) Int. Cl.
*H04B 3/54* (2006.01)
*H04B 3/58* (2006.01)
*H04W 92/02* (2009.01)

(52) U.S. Cl.
CPC ................. *H04B 3/544* (2013.01); *H04B 3/54* (2013.01); *H04B 3/58* (2013.01); *H04W 92/02* (2013.01); *H04B 2203/545* (2013.01); *H04B 2203/5441* (2013.01)

(58) Field of Classification Search
CPC ............ H04B 3/54; H04B 3/58; H04B 3/544; H04B 2203/5404; H04B 2203/5479; H04B 2203/5441; H04B 2203/545; H04L 12/2801; H04L 12/2803; H04W 92/02
USPC .......................... 375/211, 219, 220, 222, 257
See application file for complete search history.

(56) References Cited

U.S. PATENT DOCUMENTS

| | | | |
|---|---|---|---|
| 5,977,650 A | 11/1999 | Rickard et al. | |
| 7,319,717 B2 * | 1/2008 | Zitting | 375/222 |
| 7,804,763 B2 * | 9/2010 | Berkman et al. | 370/208 |
| 7,853,238 B1 | 12/2010 | Dianda et al. | |
| 2006/0170285 A1 | 8/2006 | Morimitsu et al. | |
| 2009/0135848 A1 | 5/2009 | Chan et al. | |
| 2009/0207922 A1 | 8/2009 | Yokomitsu | |
| 2010/0027599 A1 | 2/2010 | Di Chiro et al. | |

* cited by examiner

*Primary Examiner* — Leon Flores
(74) *Attorney, Agent, or Firm* — Fasth Law Offices; Rolf Fasth

(57) ABSTRACT

The method is for providing broadband access into a dwelling. A radio base station is provided that is in connection with a power-line communication (PLC) gateway. The radio base station transmits an information signal to the PLC gateway. The PLC gateway receives the signal and transmits the information signal via power-line to an inside of the dwelling.

9 Claims, 6 Drawing Sheets

METHOD FOR USING POWER LINES FOR WIRELESS COMMUNICATION

PRIOR APPLICATION

This application is a U.S. national phase application that is based on and claims priority from International Application No. PCT/US2012/032081, filed 4 Apr. 2012 and U.S. Provisional Patent Application No. 61/492,385, filed 2 Jun. 2011.

TECHNICAL FIELD

The invention relates to a method for using power lines for wireless communication such as telecommunication and broadband.

BACKGROUND AND SUMMARY OF THE INVENTION

The use of wireless communication is developing rapidly and higher performance and speed are required to meet the increasing demand for transporting large amounts of communication data for different applications such as video streaming. The currently available wireless-communication systems deteriorate substantially when the radio signals must penetrate obstacles such as walls inside homes. This has not been a major problem in the past as the amount of data required to provide voice and text information are not large compared with for example video streaming, so radio signal deterioration could be tolerated to a larger extent. More particularly, with the progress of wireless access technologies to provide higher data speeds, many telecom operators are focusing on efficiently using these to offer broadband access to their customers. This may rely on a copper and even fiber replacement scheme to offer triple and even quadruple play services compared to the previously provided information speed. However, typical deterioration of performance of a high speed data wireless technology can in most cases exceed 80% of its potential when the radio signal travels through walls. The deterioration is related to the nature and thickness of the obstacle whereby it could be due to absorption or reflection/interference and fading. When applied to a high speed data wireless access network, a typical access technology may lose more than 80% of its performance, i.e. more than 80% of the data throughput it provides at the radio base station site.

A cost-efficient solution to this problem has the potential for allowing a massive broadband deployment to households, offices, schools, and any other indoor environment. Additionally, the current solutions adopted to provide high-capacity wireless coverage indoors are complex and very expensive. Power line communication on the other hand does not have this performance deterioration problem when penetrating walls inside houses but is not used for broadband and telecommunication because it is subject to significant performance losses over longer distances and across transformer stations.

The problems resulting from the above can fall under two categories:

A) There are a multitude of competing radio access technologies; and

B) The currently adopted solutions to deploy broadband coverage indoor are complicated and expensive.

There is currently an abundance of radio access technologies that offer broadband services. This is a phenomenon that makes it difficult to drive economies of scale, roaming, and simplicity. However, most consumers and regulator authorities desire inexpensive and simple systems that may be in the form of real plug-and-play solutions anywhere at anytime without much focus on full mobility since a large portion of the world's population has not yet acquired a lifestyle to require and value this mode of usage.

A great challenge for the current suppliers and operators of wireless broadband access is to find an efficient, safe, and practical way to bring high speed data throughput indoors, into homes, schools, workplaces, airports, and even moving vehicles such as trains, airplanes and busses.

As wireless technologies move towards higher order modulations such as 32 or 64 QAM striving for more efficient usage of frequency spectrum resources and higher bits/Hz, a radio signal suffers a larger and larger deterioration above 80% of its performance due to the large loss of the payload data it carries when penetrating walls. This also means that even higher order modulations constitute no viable option for the future as far as radio signals that must travel through walls.

There is a growing level of concern among users worldwide due to the increasing closeness of an increasing number of high output power transmitting antennas to people especially due to MIMO techniques, as well as the increasing need to acquire new additional radio base station sites to carry a large number of visible antennas. In many countries there is much discussion about the likely and unexplored health hazards that this may involve, not to mention the negative visual impact that an increased number of the radio base stations introduce. As a result, many telecom regulators have started to impose limitations on the number of radio sites and the number of antennas that are allowed at a radio site. This is happening at the same time as telecommunication network vendors are promoting the densification of radio base stations and going for more and smaller cells in a concept referred to as Heterogeneous Networks.

The method of the present invention provides a solution to the above-outlined problems. In general, the present invention demonstrates that, by combining wireless technologies with power line communication in a fixed-wireless convergence scheme, it is possible to provide an inexpensive, reliable and fast wireless communication with little impact regarding the frequency band used. The system of the present invention takes advantage of the synergy between wireless communication and power line communication. Instead of having losses in the order of 80% the losses may be substantially reduced and only be in the order of 15% so that 85% or more of the original signal from the radio base station reaches the end-user although the user may be located inside a house.

More particularly, the method is for providing broadband access into a dwelling. A radio base station is provided that is in connection with a power-line communication (PLC) gateway. The radio base station transmits an information signal to the PLC gateway. The PLC gateway receives the signal and transmits the information signal via power-line to an inside of the dwelling. The PLC gateway may transmit the signal to a PLC repeater. The PLC repeater transmits the signal to customer premise equipment disposed inside the dwelling. The present invention includes the radio base station sending a wireless signal to a fixed wireless router. The wireless router receives the wireless signal and forwards the signal as a wired signal to the PLC gateway. The combination (fixed wireless router and PLC Gateway) would constitute the "Converger unit", and where fixed-wireless convergence happens. The converger unit may contain more than one wireless router serving several radio access networks belonging to one or several telecom operators. The wireless signal is thus converted to the information signal which is wired. A PLC modem may be positioned between a computer and an electrical plug connected to an electrical outlet disposed inside the dwelling. The PLC modem may also be connected to or incorporated in appliances or vehicles, hence offering a suitable solution for Smart-Grid applications.

DETAILED DESCRIPTION

One important purpose of the present invention is to transfer voice, video and other data through the air when it is efficient to do so and then use the existing electricity power/utility network grid to transfer the data when obstacles such as walls must be penetrated.

Figure 1:
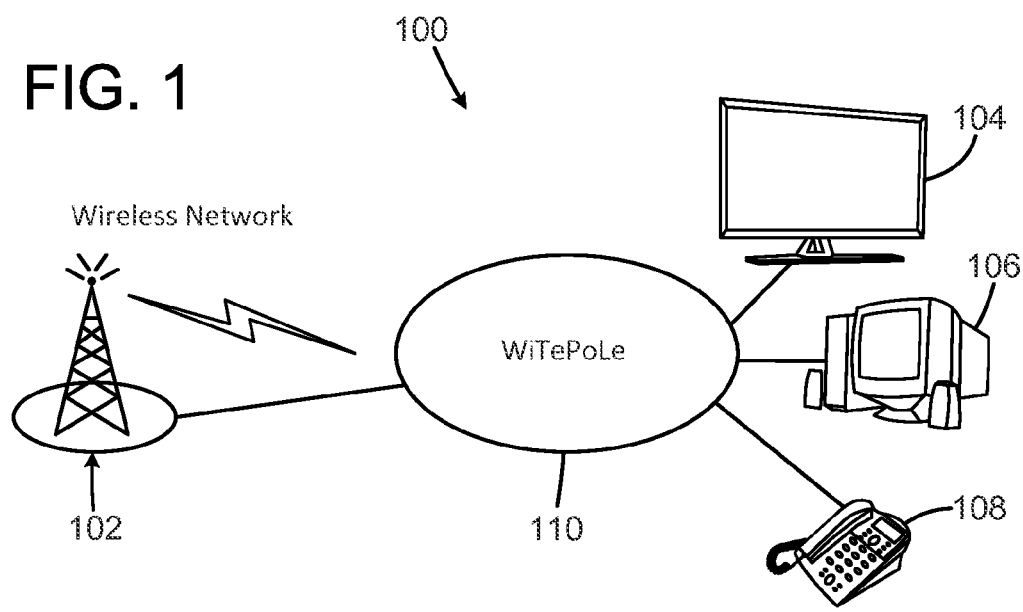
FIG. 1 is a schematic overall view of the system of the present invention.

FIG. 1 shows a system 100 that has a radio base station 102 in wireless communication via the air with the device system 110 of the present invention. When the radio base station is close enough, the communication may be taken directly from the transmission modules or back-haul of the site i.e. at the radio base station, as discussed in detail below. Back-hauling may be used as a transport medium to transmit the communication from the radio base station into switches or routers. The device system 110 in turn is in communication with the devices 104, 106 and 108 via the already existing electric power grid, as explained in detail below. Today's individual household may require as much as 10 Mbps or more in order to simultaneously run television and computers over the broadband Internet. The use of the power lines into each household makes the transfer of data very inexpensive and practical since the transmission cables are already drawn, and electricity plugs are widely distributed in homes and other indoor locations. Connecting a power line communication (PLC) modem to any electricity plug enables access to broadband Internet while serving home appliances such as televisions. One problem is that transmitted signals get attenuated when they travel over electricity cables and through transformer stations to such an extent that the transfer of high-speed data over a longer distance (such as over 1000 meters) is seriously hampered. However, when it comes to short distances, such between the power meters in buildings and power outlets at homes, PLC works very well and is able to deliver transmission speeds above 240 Mbps per user, depending on the PLC technology used. Examples of such technologies are the IEEE/OPERA and the G.hn/G.hnem developed by ITU.

According to the present invention when an operator intends to provide indoors Internet access, the following elements are combined:

Established digital Mobile Telecom technology, for example WCDMA/HSPA, LTS, LTE Advanced, or WiMAX;

Fixed wireless routers (FWR); and

PLC equipment in order to transmit or transport the signal inside homes through electricity cables, and connect to Customer Premises Equipment (CPE)/Modems.

The products involved should be combined and connected, in a very advanced manner to assure deployment on a large scale and to allow a multitude of telecom users to use the system of the present invention.

Figure 2:
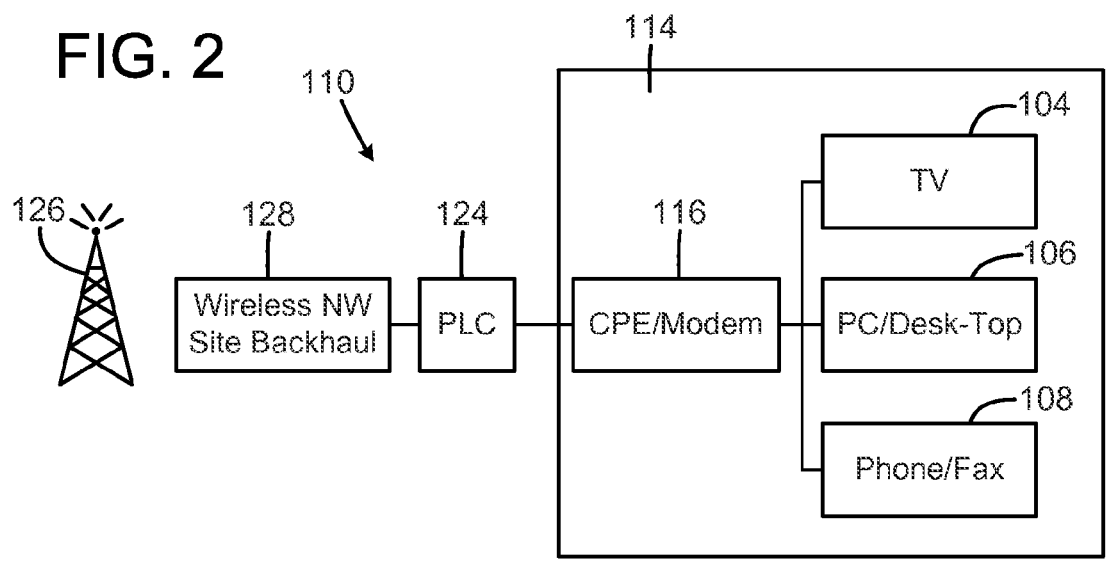
FIG. 2 is a schematic block diagram of some of the components of the system of the present invention when the radio base station is close to the homes.

FIG. 2 shows device system 110 connected to a home 114. The home 114 has a customer premises equipment (CPE) modem 116 connected to, for example, the television 104 and personal computer 106 and a telephone/fax 108. The CPE/modem 116 is in turn connected to a power line communication device (PLC) 124. In this example, the home 114 is in close proximity to a radio base station antenna 126 that is in communication with a wireless NW site backhaul 128. The PLC can already be installed within the site and connected directly to the backhaul equipment on site.

Figure 3:
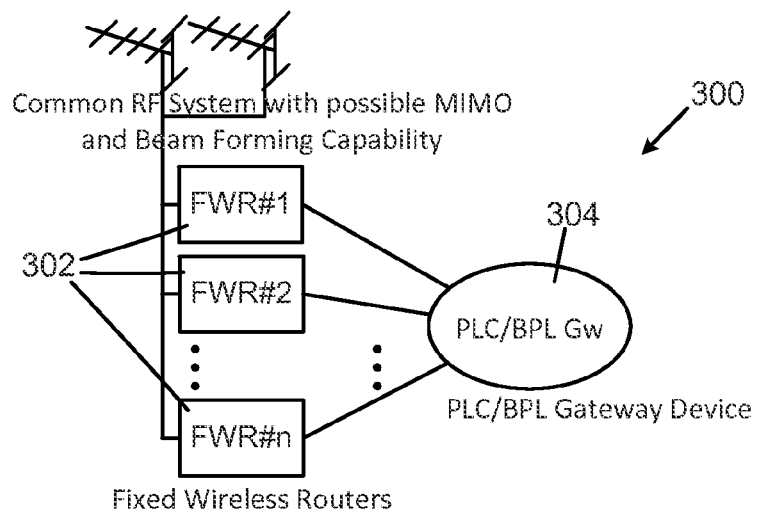
FIG. 3 is a schematic view of the converger unit of the present invention.

FIG. 3 shows a converger unit 300 wherein several WilePoLe Fixed Wireless Routers FWR:s 302 can connect with a PLC/BPL Gateway 304 in a well-integrated and protected manner, suitable for both indoor and outdoor installations. Each router connects to a specific operator's network to deliver data services, including Voice over IP (VoIP), Internet, and IP-TV.

Figure 4:
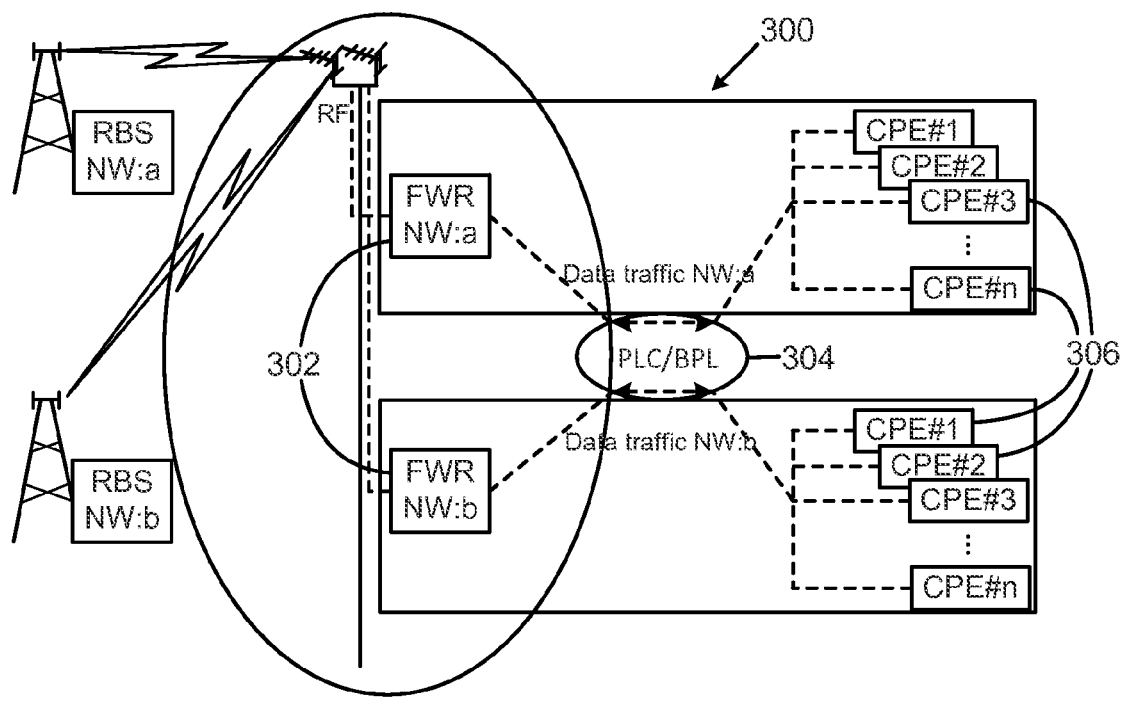
FIG. 4 is a schematic view of the data traffic flow through the converger unit of the present invention.

The data traffic flows through the converger unit 300 is that whereby the Fixed Wireless Routers (FWRs) 302 connect with the different Radio Access Networks they belong to. It is then intended that data traffic to and from the Customer Premises Equipment (CPE) 306 belonging to each operator will flow through the FWR attached to that particular operator as best shown in FIG. 4. Regarding chipset integration, it is possible that in a future scenario a higher level of integration combining the fixed wireless routers and the PLC Gateway equipment be done on chipset level, whereby a hybrid chipset can be developed uniting the PLC (for example: OPERA or ITU G.hn) chipset with that of the 3GPP chipset (for example HSPA/LTE) or the WiMax chipset. Also, the International Telecommunication Union (ITU) standardization organ has also developed a standard referred to as G.hn and G.hnem which defines networking over power lines among other, and whereby signals can be transmitted over power carrying electricity cables in addition to neutral ground cables when these are available.

Figure 5:
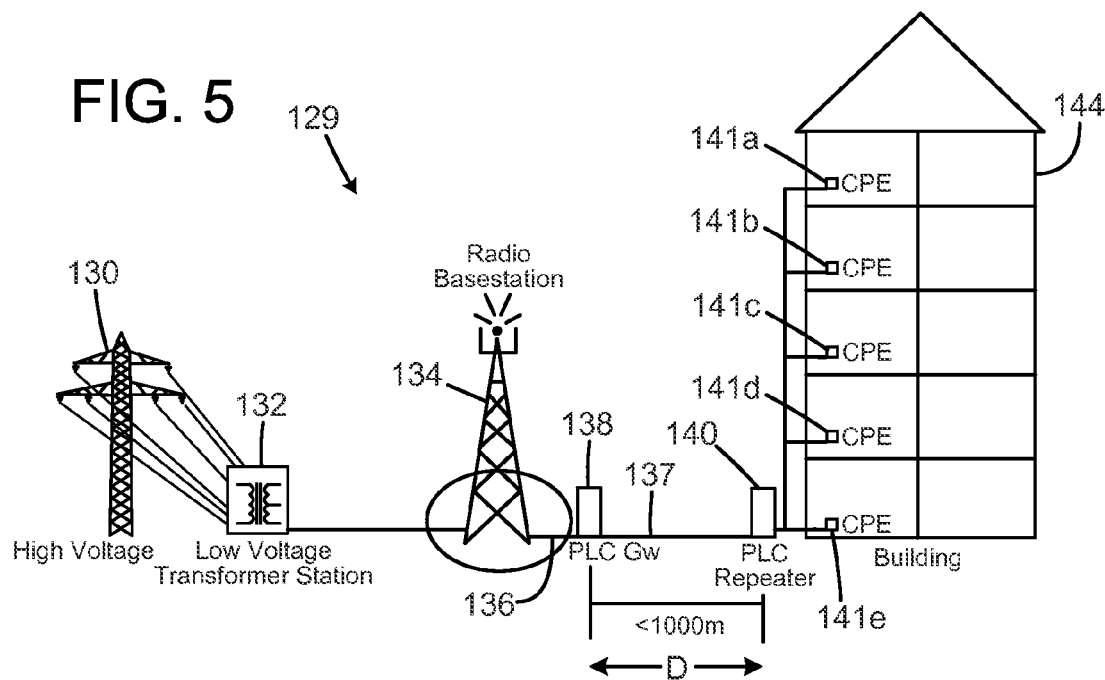
FIG. 5 is a schematic overall view of the system of the present invention when the radio base station is close to the homes.

FIG. 5 is a general view 129 that shows a high voltage power line 130 connected to a low voltage transformer station 132 (such as 230V systems). The radio base station 134 is in direct communication with a PLC Gw 138 (PLC Gateway), that in turn, is in communication with a PLC Repeater 140 via a power line 136 that carries a current/voltage from the transformer 132. In other words, the communication signal 137 is transmitted directly from the transmission modules of the radio base station 134 to the PLC Gw 138 when the PLC Gw 138 is very close to the base station such as 5-30 meters or less. Preferably, the distance (D) between the PLC Gw 138 (and thus the station 134) and the PLC Repeater 140 should be less than 1000 meters since the shorter the distance the lower performance loss of the data or information signal 137 transmitted in the electrical power grid or power line 136 leading into the inside of the dwelling or building 144. In this case, there is no need for a wireless router to receive wireless signals from the radio base station 134 since the PLC Gw is connected directly to the backhaul equipment in the station 134. The signal (such as broadband) is distributed to homes directly from the site, without having to travel over the air interface from the radio base station 134 in the last kilometer of the transmission. The PLC repeater 140 is in communication with the CPEs 141*a*, 141*b*, 141*c*, 141*d* and 141*e* inside the multi-family building 144. As mentioned earlier, the building 144 should ideally be located within 1 km from the PLC Gw 138 to keep the performance losses in the power line 136 at a minimum. This example situation is ideal and provides the highest performance. The sites act as access points to the IP network and no wireless connection are needed between the base station 134 and the CPEs 141*a*-141*e* disposed inside the building 144. As indicated above, this avoids the substantial loss of performance when wireless signals must travel through walls. This scenario is particularly suitable when distances from radio sites to homes are very short and the signal over the PLC does not have to travel through electricity transformer stations. The signal is thereby received through any electricity plug in any room. The PLC modems are easily monitored through a central O&M to deliver the required amount of data throughput per subscription.

Figure 6:
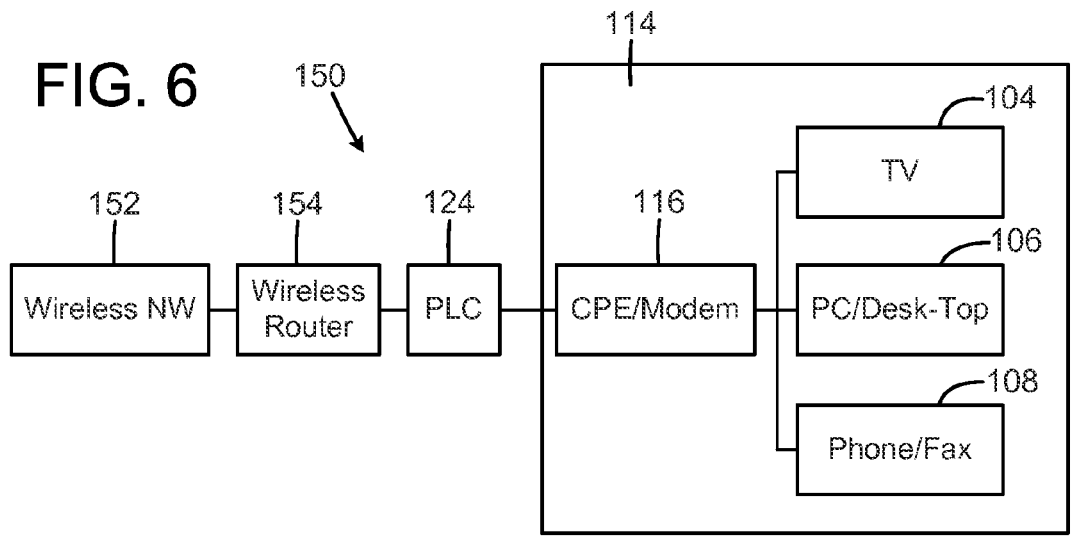
FIG. 6 is a schematic block diagram of some of the components of the system of the present invention when the radio base station is remote from the homes.

FIG. 6 is a schematic view 150 that has a wireless network 152 connected to a fixed wireless router (FWR) 154 that in turn are connected to the CPE/Modem 116 via the PLC 124. The CPE/modem 116 is then connected to communication devices such as the television 104, a personal computer 106 and telephone/fax 108. More particularly, the view 150 describes a situation the home 114 is located at a far distance from the base station sites, and therefore the PLC 124 would not be the ideal means for transporting the broadband signal due to the significant performance losses over greater distances. One feature here is that the broadband signal is transmitted over the air interface to the fixed wireless router 154 instead. The wireless network 152 connects to the FWR 154 through a suitably positioned outdoor antenna system. This could, for example, be a pole or a roof-top to provide the best signal transmission quality (C/I) on both UL/DL. This in turn guarantees the highest possible data throughput. The FWR 154 is preferably placed right after the electricity transformer station 132.

This throughput is then carried to the home 114 and other homes through the electricity installation (power meter—electricity outlets) using the PLC technology, as the transmitted signal from the FWR 154 may connect with the PLC Gateway Device (PLC Gw) 138 in a one box concept. In other words, the wireless signal (135) is received by the FWR 154 from the radio base station 134 and converted to the wired signal 137 that is then sent to the PLC Gw or gateway 138. The PLC gateway 138 connects to the electricity network including the power line 136 and distributes the wired signal 137 to customers. Preferably, the homes should ideally be located within 1 km from the FWR/PLC Gw box also. The signal is thereby received through any electricity plug in any room. The PLC modems are easily monitored through a central O&M to deliver the required amount of data throughput per subscription.

Figure 7:
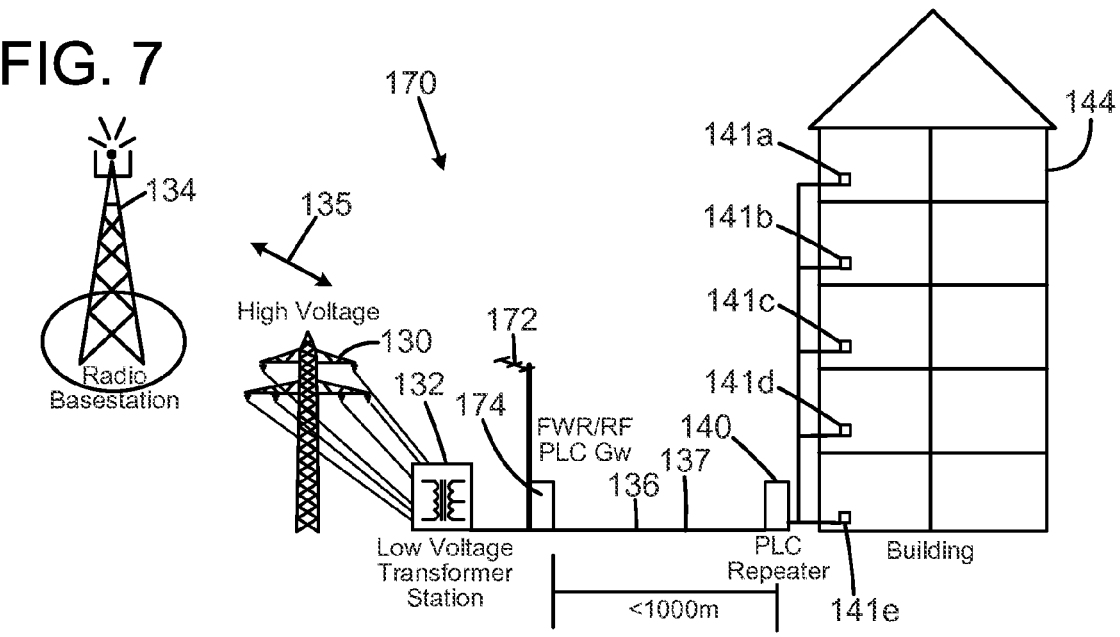
FIG. 7 is a schematic overall view of the system of the present invention when the radio base station is remote from the homes.

FIG. 7 is a general view 170 that again shows the high voltage power line 130 connected to a low voltage transformer station 132. The radio base-station 134 is remotely positioned relative to the building 144. The transformer station 132 is in communication with a FWR/PLC Gw box 174 via the power line 136. The box 174 is in communication with the PLC Repeater 140 also via the power line 136. Preferably, the distance (D) between the FWR/PLC Gw box 174 and the PLC Repeater 140 should be less than 1000 meters. Ideally, the box 174 may even be located on the roof of the building 144. The PLC Repeater 140 is then in communication with the CPEs 141*a*, 141*b*, 141*c*, 141*d* and 141*e* of the multi-family building 144. The broadband/radio signal is distributed to the homes by traveling through the air interface as a wireless signal 135 between the radio base-station 134 and an antenna 172 of the FWR/PLC Gw box 174 which includes a combination of the Fixed Wireless Router/Terminal (Modem) or FWR/RF 154 and the PLC Gw 138. The performance loss of the air interface is kept to a minimum as the radio signal is captured outdoors, often in line-of-site. The building 144 should ideally be located within 1 km from the box 174 to reduce the signal degradation in the power line 136. This is particularly important regarding modulation techniques of 4G and other high performance networks. This example demonstrates the usefulness in all rural areas but other areas may also benefit from the system of the present invention. Note that the converger unit is preferably the combination of the FWR/PLC Gw box 174 and the antenna system 172.

The deployment of the system of the present invention has the potential of being expanded beyond households to cover any indoor environment. It is hence conceivable that the system could be used in vehicles such as boats, trains, and airplanes. The system of the present invention may also prove to be a good compromise solution to handle future machine-to-machine communication.

The components of the system of the present invention are now described in more details. The Fixed Wireless Routers (FWR) 154 and the Power-line Communication Gateway (PLC Gw) 138 may be combined in a modular one box solution i.e. FWR/PLC Gw box 174) and referred to as the "Converger" unit. The "Converger" unit box is preferably designed so that the FWR 154 can be easily removed and replaced for maintenance or upgrade purpose.

The casing of the "Converger" unit box 174 should comply with the following functional specifications:
  Fully weather proof architecture, including lightning protection and tolerance for ambient temperatures of −35° C. to +60° C. in addition to humidity protection;
  Passive and environmentally friendly cooling/heating;
  Full insulation from electricity shock hazards, especially since it will have to connect, on low-voltage electricity cables;
  Resistant to destruction;
  Protected opening for RF cable; and
  The casing may include an integrated RF functionality, such, as panel antenna or similar.

Preferably, the FWR 154 connects to an external directional antenna system, ideally placed, outdoors at the top of a pole or a roof-top. The purpose is to enable good radio conditions and line-of-site. The antenna can also be designed in order to manage Multiple Input. Multiple Output (MIMO), Beam Forming, and other antenna techniques. If necessary, a signal booster may be used to strengthen the incoming signal. The FWR should be designed with the following features:
  Support radio redundancy;
  Support external antenna(s) with MIMO capability, beam forming, and possible future RF enhancements;
  Support one multi-band RAN technology;
  Support VoIP;
  Support battery back-up;

Support incoming signal booster if such is found, necessary;

SIM card activation should be necessary, and operator/cell locking mechanisms should be included;

Support for wide AC voltage range (80-250 V) and different DC power alternatives such as 12V and 24V;

Full remote management; and

100/1000 Mbps Ethernet Connection (RJ45) interface or any other suitable interface.

Moreover, the interface with the PLC Gw 138 should be designed in a manner to allow smooth replacement of the FWR 154 in a plug-and-play manner. IP transport is the main mode of transmission over Ethernet at a suitable layer to enable maximum throughput. Both IP version 4 and IP version 6 can be used although IP version 6 would be the preferred protocol. The PLC should also benefit from the latest in the technology with, for example, OFDM and other such suitable techniques. The PLC Gw 138 should comply with the following requirements:

Support IP over Ethernet, for both IP V4 and IP V6;

Easy physical installation;

Small and slim design to fit in every installation environment;

Support for wide AC voltage range (80-250 V) and different DC power alternatives such, as 12V and 24V;

Support Battery Back-up;

Full remote management;

Support OFDM; and

100/1000 Mbps Ethernet Connection (RJ45) interface with the possibility of simultaneously connecting to more than one fixed wireless router connected to different access technologies.

At the customer premises, the data signal is extracted from the home electricity plugs. This is an important part of the system of the present invention that should be managed correctly for successful massive deployment and that is technology agnostic. It is therefore possible that:

Fixed Wireless Routers from different RAN technologies use the same PLC equipment; and Different routers from the same RAN technology but belonging to different operators use the PLC equipment installed Therefore the CPE should be able to:

Identify the end-users;

Identify the source of signals and allow the correct signal to pass to the right end-user;

Regulate the data rate that can pass through it, so based on the subscription type, it should be able to set an upper limit for throughput;

Full remote management;

Support OFDM;

Support W-LAN with encryption;

Support RJ45 10/100 Mbps Ethernet interfaces;

Support USB contact interfaces;

Support IP Telephony/Voice over IP (VoIP); and

Support TV contact interfaces such as HDMI contact or other.

It is possible that a special modem be needed for special applications such as the PLC modem integrated in the power cables of laptops, desktops, and other devices needing Internet connectivity. The special modem should have similar functionalities compared to the CPE:

Fixed Wireless Routers from different RAN technologies use the same PLC equipment; and Different routers from the same RAN technology but belonging to different operators use the PLC equipment installed.

The special modem should be able to:

Identify the end-user;

Identity the source of signals and allow the correct signal to pass to the right end-user;

Regulate the data rate that can pass through it, so based on the subscription type, it should be able to set an upper limit for throughput;

Full remote management;

Support OFDM; and

Support RJ45 contact interface;

Support of IP V4 and IP V6.

An operation and management system (O&M) should be designed to act as one single remote interface to all the components involved in the system of the present invention. It should be designed to:

Connect to, control, and monitor the functionality of the components, FWR, PLC, and CPE;

One single O&M center should be able to handle a large number of invention devices (in the tens of thousands); and It is recommended that it be based on a platform that is commonly used in Telecom O&M.

In summary, the system of the present invention is a new concept combining wireless communication technologies with that of Power Line Communication (PLC). The system is an effective concept for the development of countries and whereby motivation is provided to increase telecom coverage as well as the reach of electricity grids to new areas. The system benefits all parties involved in telecommunications, equipment suppliers, operators, and end-users alike.

Figure 8:
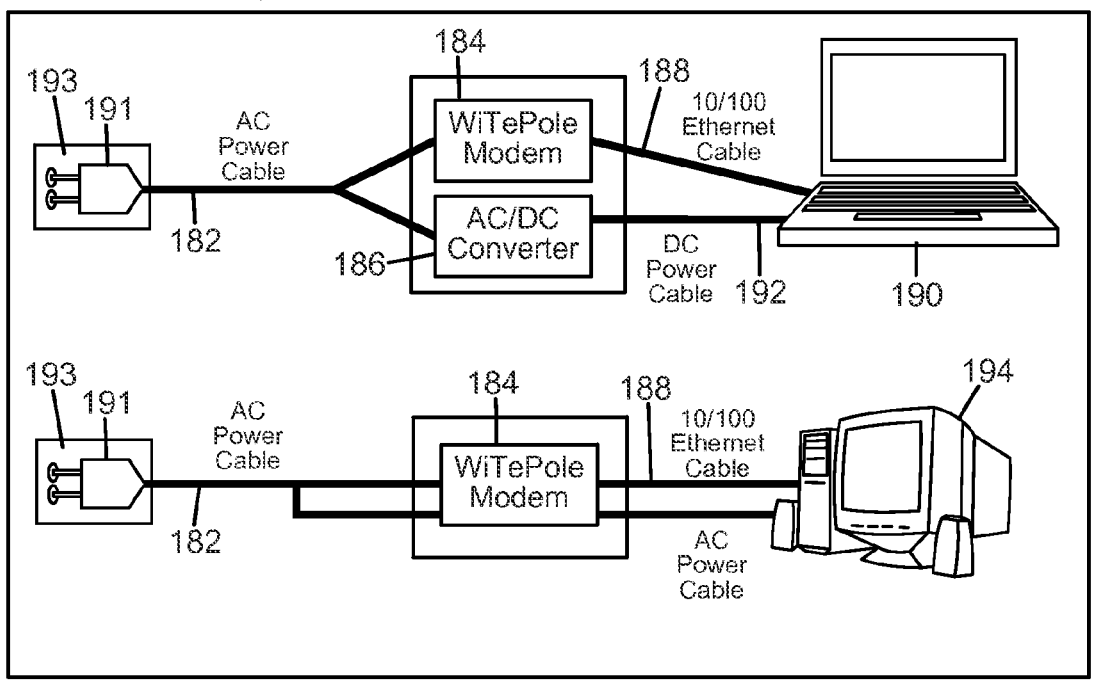
FIG. 8 is a schematic view of a PLC modem of the present invention connected to computers and tablets and whereby the modem is integrated in the power cable of desktops, lap-tops, tablets, and similar devices in need of Internet connectivity.

It is possible to use the special PLC modem in connection with powering computers and even tablets. FIG. 8 is a schematic view 180 that has an AC power cord 182 that has one end connected to the special modem 184 and AC/DC converter 186 and the other end connected to an electric plug 191 at an outlet 193 on a wall. A cable 188 may be used to connect the modem 184 to the computer 190 (such as a battery powered laptop computer or tablet), while a DC power cord 192 may be used to connect the converter 186 to the computer or tablet 190. Similarly, when there is no need for the AC/DC converter then the power cord 182 extends directly to the computer 194 (such as a desktop computer that is not battery powered). The idea here is to build the special PLC modem 186 into power cables going to PCs and Desk Tops to assure Broadband connectivity. This is expected to be a practical means of assuring broadband connectivity as the system of the present invention becomes a widespread concept throughout the world. The present invention is not limited to PCs. It is also possible to add a modem such as a WiTePoLe modem to the electricity supply of a Tablet would be similar to doing the same for a PC. A WiTePoLe PLC modem may be inserted in the power supply cable that provides internet connectivity.

Figure 9:
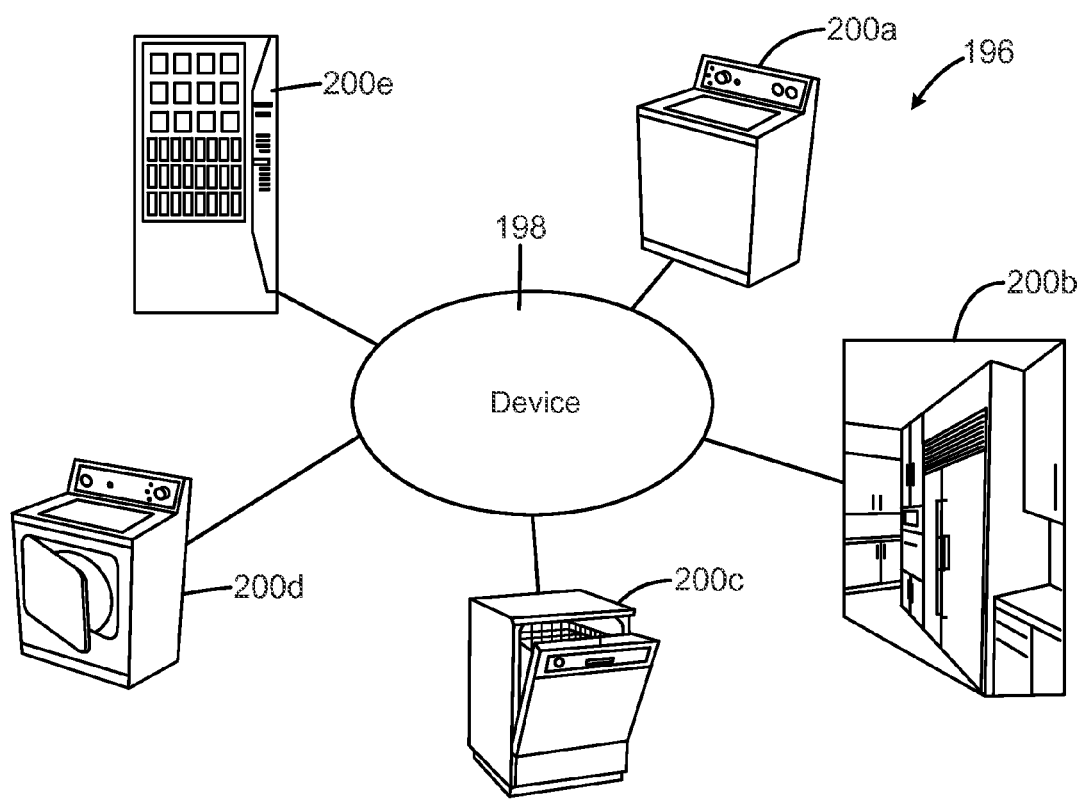
FIG. 9 is a schematic view of the system of the present invention connected to appliances.

It is also possible to use the built-in PLC modem 184 in home appliances. Machine-to-machine connectivity is the next frontier when it comes to the telecom industry. Many home appliances manufacturers are designing their products to take benefit from the new smart grid concept. Also, snack vending machines can be enhanced with communication capabilities. FIG. 9 shows a schematic view 196 of the system 198 of the present invention connected to various appliances and vending machines 200*a-e*. It is possible that the system of the present invention may be adopted as a compromise communication solution for home appliances and snack vending machines manufacturers. This is especially valid should the system of the present invention be able to successfully drive the expansion of the electricity grid and telecom coverage to new areas.

Figure 10:
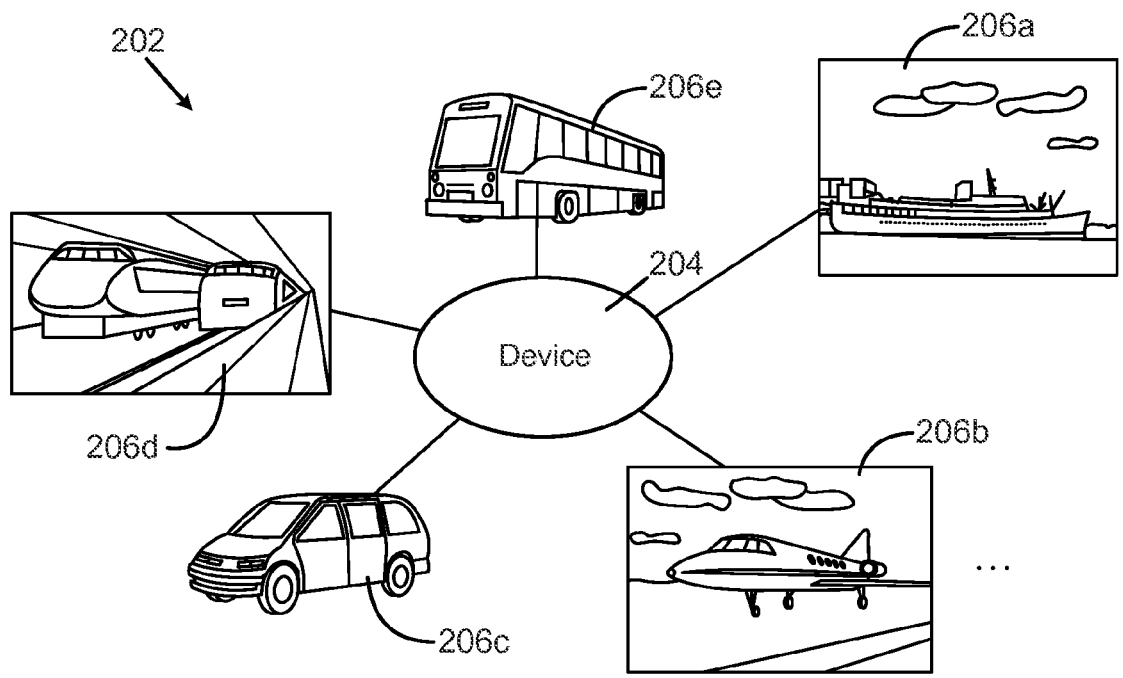
FIG. 10 is a schematic view of the system of the present invention connected to vehicles.

Larger vehicles such as MPV, SUV, trains, airplanes, boats, and busses could benefit from an adapted system solution whereby the internal electricity cables of these vehicles may be used to transfer broadband signals, while connecting to wireless networks through routers with suitably placed antennas. FIG. 10 is a schematic view 202 that has the system 204 of the present invention connected to various vehicles 206a-e. This will have to involve in certain cases special PLC equipment that works with DC power. The modem then connects to the standard DC outlets found in cars and busses or normal outlets providing DC power. For the rest (trains, boats, airplanes), the normal PLC equipment working with AC power will be needed.

As the Pico and Femto RBS are progressively gaining widespread as office and home access points, it remains in many regions a challenge to provide these with the adequate IP connectivity to the core network. The system of the present invention may be used here to provide this connectivity over a suitable radio access network (for example LTE) to be used as a backhaul.

While the present invention has been described in accordance with preferred compositions and embodiments, it is to be understood that certain substitutions and alterations may be made thereto without departing from the spirit and scope of the following claims.

The invention claimed is:

1. A method for providing broadband access, comprising:
   providing a radio base station in connection with a power-line communication (PLC) gateway of a PLC;
   connecting the PLC gateway and a PLC modem to an operation and management system (O&M);
   the radio base station transmitting an information signal wirelessly to a fixed wireless router (FWR), the FWR forwarding the information signal to the PLC gateway;
   the PLC gateway receiving the information signal and transmitting the information signal via a power-line to the PLC modem via an outlet at an inside of a dwelling;
   the FWR locking to an operator and cell;
   the PLC modem powering a communication device;
   the PLC modem identifying end-users;
   the PLC modem identifying a source of the information signal and passing a correct information signal to a right end-user;
   the PLC modem regulating a data rate that pass through the PLC modem based on a subscription type of the right end-user and setting an upper limit of the data rate based on the subscription type; and
   the O&M controlling and monitoring the PLC and FWR.

2. The method according to claim 1 wherein the method further comprises the PLC gateway transmitting the signal to a PLC repeater.

3. The method according to claim 2 wherein the method further comprises the PLC repeater transmitting the signal to customer premise equipment via an electric outlet disposed inside the dwelling.

4. The method according to claim 1 wherein the method further comprises the radio base station sending the wireless signal to an antenna.

5. The method according to claim 4 wherein the method further comprises the wireless router receiving the wireless signal via the antenna and forwarding the signal to the PLC gateway.

6. The method according to claim 1 wherein the method further comprises converting the wireless signal to the information signal which is wired.

7. The method according to claim 1 wherein the method further comprises positioning an electrical plug at one end of a power cord into the outlet connecting another end of the power cord into a PLC modem between a computer or tablet.

8. The method according to claim 7 wherein the method further comprises connecting the PLC modem to appliances.

9. The method according to claim 7 wherein the method further comprises connecting the PLC modem to vehicles.

* * * * *